Jan. 3, 1956  J. J. KUEHN  2,729,079
WEIGHT SENSITIVE PULL AND BRAKE CLUTCH
Filed Feb. 3, 1955 2 Sheets-Sheet 1
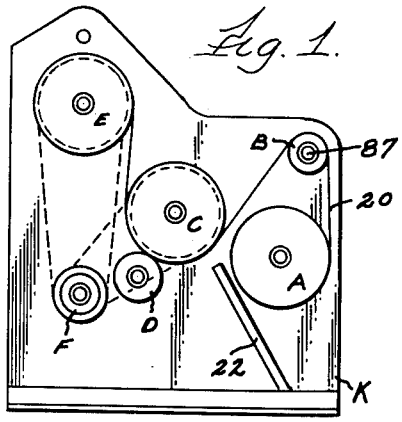
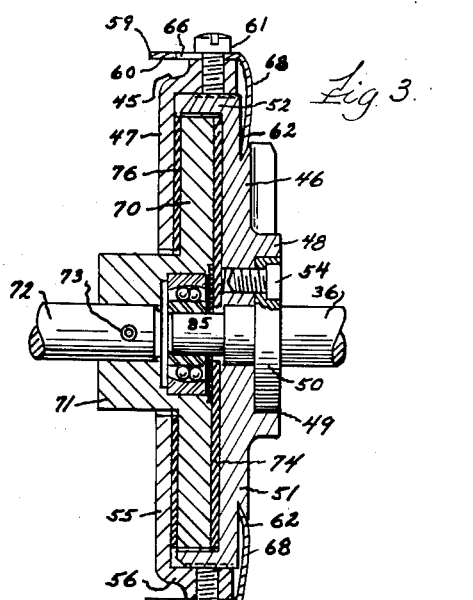
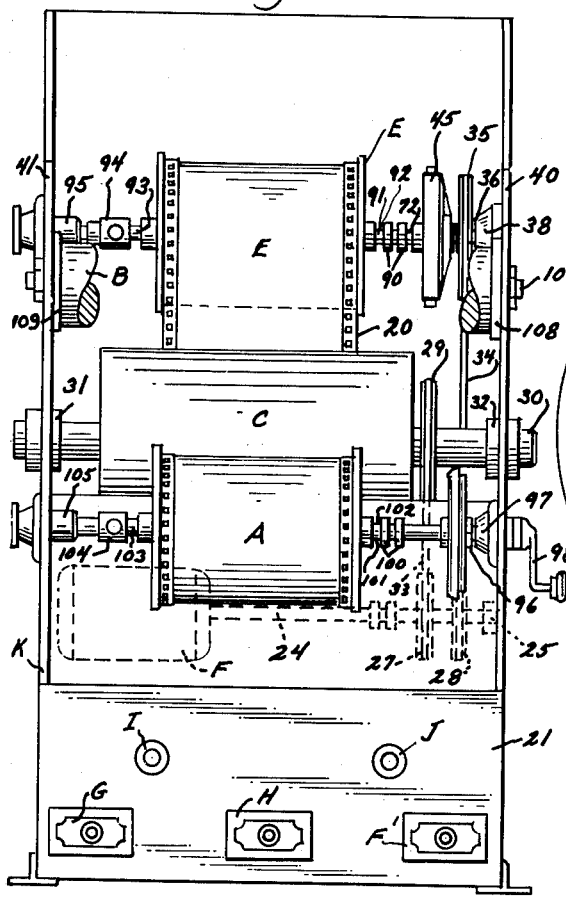
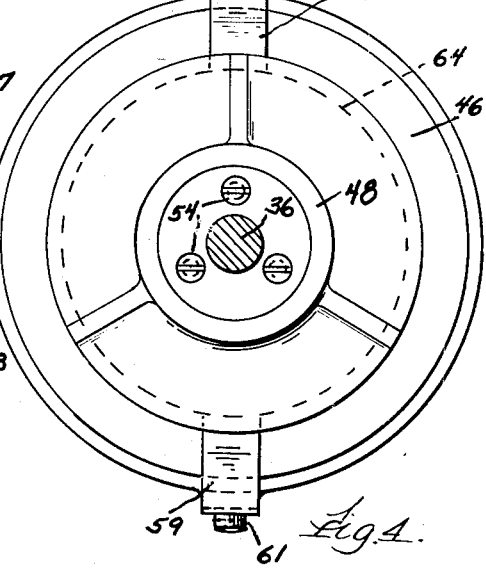
INVENTOR.
JOHN J. KUEHN.
BY Joseph B. Lindecker.
ATTORNEY.

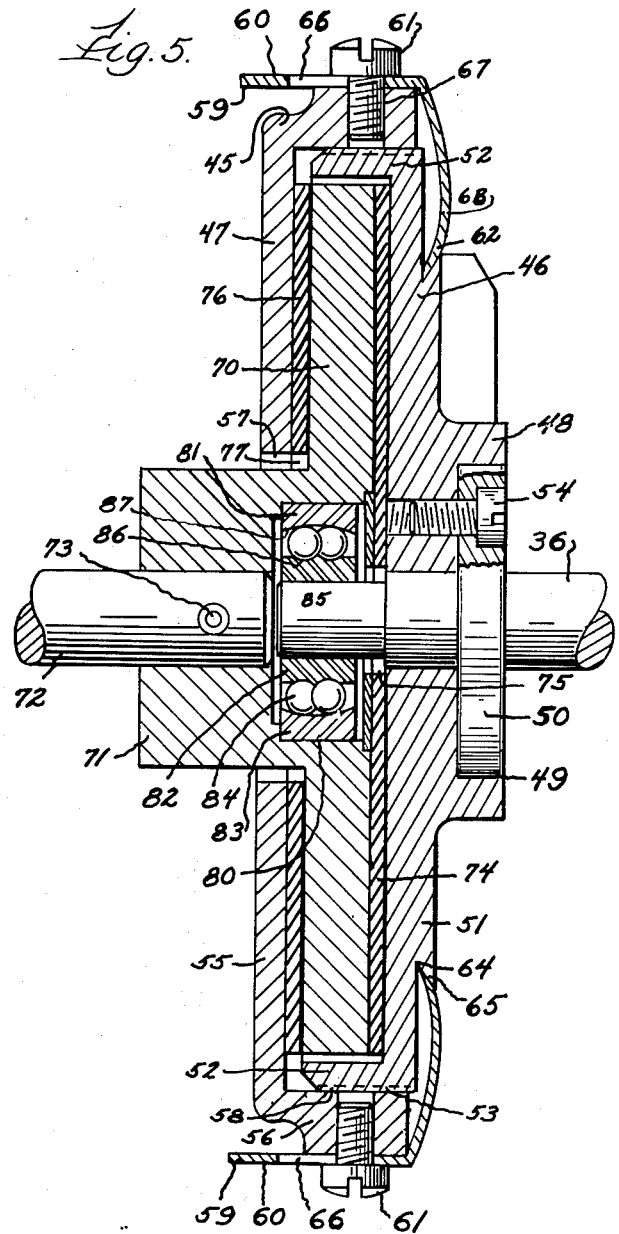

United States Patent Office 2,729,079
Patented Jan. 3, 1956

2,729,079

WEIGHT SENSITIVE PULL AND BRAKE CLUTCH

John Julius Kuehn, Chicago, Ill.

Application February 3, 1955, Serial No. 485,976

1 Claim. (Cl. 64—30)

This invention relates to a weight sensitive pull and brake clutch, primarily useful in connection with a continuous contact printer to increase the friction on the driving clutch as the film on the take-up reel increases.

The primary object of my invention is to provide a friction clutch driving mechanism for a winding reel, whereby as the material on the reel increases, the added weight will increase the tension on the clutch.

Another object is to provide a weight sensitive clutch for use on a continuous contact printer where a constant pull is maintained, regardless of the weight of footage, paper or film, the pull on the take-up reels and the braking on the feed reels remaining constant, and thereby providing constant contact, with a minimum of slippage, between the positive and negative materials.

Still another object is to provide a sensitive pull and brake clutch free of oil-saturated parts and incorporating circular discs of sintered material assembled with a driven disc and the driving member.

A further object of the invention is to provide means whereby the power of the driven, or take-up, reel member is automatically varied as the diameter of the roll film on the take-up reel increases with corresponding decrease in speed of the take-up reel.

A still further object of the invention is to provide a mechanism in which the increase frictional engagement between the driving means and the driven means will automatically be returned to a normal frictional engagement when the tension of the footage is changed.

A still further object of the invention is to provide a drive shaft, a driven shaft, a clutch housing incorporating two circular discs of sintered material, a dry metallic disc having a hub portion and a self-aligning ball bearing, said bearing having its inner race secured to the end of said drive shaft and its outer race fitted within a recess within the hug portion of said dry metallic disc which is secured to said driven shaft.

A still further object of the invention is to provide a weight sensitive pull and brake clutch permitting the frictional engagement of the driving and driven means to vary, said clutch to be free of spring members or other tension devices which always need adjustment from time to time due to extensive use thereof.

A still further object of the invention is to provide a weight sensitive pull and brake clutch comprising a driving shaft, a driven shaft, a reel on said driven shaft, a housing mounted upon said driving shaft for rotation therewith, said housing having an axial opening therethrough, a metal driven disc within said housing having a hub portion extending through said axial opening from within said housing and connected with said driven shaft, a circular frictional disc of sintered material positioned adjacent each of the opposite sides of said metal driven disc frictionally coupling said driven disc with said housing, said circular discs of sintered material being dry and free of oil, a self-aligning ball bearing within said housing, its inner race assembled on the drive shaft, its outer race assembled with the driven disc, said bearing permitting angular movement of the free end of said driven shaft to vary said frictional coupling as a function of weight of said film reel upon said driven shaft.

A still further object of the invention is to provide a weight sensitive pull and brake clutch wherein the driving shaft and the driven shaft are subjected to varying forces in a direction angular to the axis of rotation of the shafts, whereby the degree of frictional coupling is automatically varied as a function of such forces.

Issued patents pertaining to weight sensitive pull and brake clutches usually show devices embodying a housing with friction discs therein made of leather, saturated with oil, and in combination with metal discs covered with oil. With said devices it is necessary to have a clearance five-one thousandths (5/1000) of an inch. When the weight of a printer reel increases on one of said devices, an undesired motion will result, the inner metal disc will tend to creep upwardly within the housing and will release intermittingly; mostly on the downward turn, which causes an uneven pull. Applicant has invented a novel device giving a vibrationless, smooth operation. The novel device operates entirely free of oil on the friction discs and embodies means to prevent the inner metal disc from scarring the inner annular surface of the male housing, preventing chips from becoming lodged in the two frictional discs and an uneven pull, giving perfect operation. Applicant's novel means includes a pivot-type, spherical-type bearing assembled with the metal driven disc embodied in the clutch. The inner race of the bearing is held by a drive shaft mounted in the male member of the housing, permitting the outer race to be assembled in the hub portion of said driven disc. The bearing permits smooth operation and prevents the inner frictional disc from contacting the housing with increasing or decreasing of the weight of a printer reel. Desired friction is obtained truly by the side pressure of the friction members, permitting smooth operation superior to former devices.

Other and further objects of the invention will be suggested to those skilled in the art by the description which follows.

To these and other ends, the invention consists of certain parts and combinations of parts all to be hereinafter described; the novel features being pointed out in the appended claim.

Reference is hereby made to the accompanying drawings wherein similar reference characters designate similar elements and wherein:

Figure 1 is a diagrammatic side elevation of a contact printer, according to the invention, illustrating the operation of the parts and the travel of the film from the feed reel to the take-up reel, parts of the printer not being shown.

Figure 2 is a front elevational view of a contact printer embodying the features of the invention, the upper section of the printer and various other parts of the lower section not being shown.

Figure 3 is an enlarged sectional view of the housing enclosing the dry friction discs and assembled to the drive shaft.

Figure 4 is a front view of the housing and drive shaft, as shown in Figure 3.

Figure 5 is an enlarged view of the assembly, as shown in Figure 3.

Inasmuch as the invention relates particularly to a weight sensitive pull and brake clutch primarily for driving the take-up reel for the film, and releasing the braking on the film feed reel, the accompanying drawings show only as much of the entire contact printer as will be of assistance in apprehending the invention.

Although only one form of a weight sensitive clutch embodying the invention concept has been described and illustrated in the accompanying drawings, it is to be expressly understood that these drawings are for purposes of illustration only and they are not to be construed as defining the limits of the invention, reference being had for the latter purpose to the appended claim.

In the drawings, like reference characters indicate like parts throughout the several views, and the thickness of the circular discs of frictional material positioned adjacent each of the sides of the sintered metal disc has been exaggerated in order to more clearly illustrate the details of construction.

Referring to Figure 1 of the drawings, A designates the reel of film which is unwound to provide a web 20 which passes around idler roller B, then downwardly under and around the focal roller C in contact with pressure roller D, and then upwardly to the film take-up reel E. Running between the focal roller and the pressure roller is fed the usual web of sensitized paper, or film, used with a printer of this type; however, said paper is not shown in the drawings.

The operating controls for the printer located on the front control panel 21, as shown in Figure 2, are as follows: motor switch F, printing light switch G, view lighting switch H, printing lamp aperture control I, and motor speed control J. Numerous other controls are used but are not shown here by the drawings.

Referring to Figures 2 and 3 of the drawings, the lower portion of the contact printer housing is designated K, the top portion of the housing not being shown. The housing K embodies the instrument panel 21, a baffle board 22, and necessary supports for the motor F. The motor F, shown dotted, has a drive shaft 24 with its free end mounted in bearing 25 supported by the side wall 40 of said housing. Adjacent said bearing 25 is mounted two driving pulleys 27 and 28 upon said shaft 24; pulley 27 has a belt 33 assembled therewith to drive a pulley 29 mounted upon a shaft 30 for driving the focal roller C, said shaft 30 being mounted in bearings 31 and 32. Said pulley 28 has a belt 34 assembled therewith to drive a pulley 35 mounted upon shaft 36 supported in a rigid bearing 38. The free outwardly extending end of said shaft 36 supports a clutch housing 45 comprising two cup-shaped members 46 and 47. The cup-shaped member 46 has a hub portion 48, said hub having a cylindrical bore 49 adapted to receive a cylindrical flange 50 on shaft 36. Said cup-shaped member 46 having a flange portion 51 extending outwardly from said hub 48, and a horizontal cylindrical portion 52; said portion 52 having external screw threads 53 on its peripheral surface. The cup-shaped member 46 is rigidly secured to shaft 36, the drive shaft of this assembly, by use of three fillister head machine screws 54 arranged in three holes equally spaced in said flange 50 and screwed tightly into hub portion 48 of said cup member 46.

Associated with said horizontal cylindrical portion 52 is the cup-shaped member 47 with a vertical flange portion 55, a horizontal cylindrical portion 56, and an axial opening 57. Said cylindrical portion 56 is provided on its interior with threads 58 for engagement with threads 53 of the cylindrical portion 52 to form an adjustable housing to enclose the yielding mechanism about to be described and which was expounded in the aforesaid objects. Said housing incorporates a locking means comprising two angular fasteners 59 having spring-like charteristics, said fasteners 59 each having one end 60 of its horizontal portion adjustably secured to the outer surface of said cup-shaped member 47 by means of a screw 61, and having its opposite end 62 forming the end of the vertical portion in pressing and locking engagement with the outer surface of said member 46. Said end portion 62 of the vertical leg extension is tapered and of arcuate configuration, similar in configuration to the base or bottom surface 64 of an annular V-shaped groove 65 arranged in the outer surface of male cup-shaped member 46. The horizontal extension of said fastener 59 having an elongated opening, or slot, 66, through which the threaded portion 67 of screw 61 will freely pass. Said slot 66 is elongated so that the vertical leg extension can be moved into substantially close engagement with the side wall of housing member 46 when said horizontal extension of fastener 59 is drawn into tight engagement with flange 56 by means of screw 61, thereby forcing the tapered edge portion of end portion 62 into pressing and locking engagement with adjacent portions of said V-shaped annular groove 65. The vertical leg extension is of greater length than the distance between the V-shaped groove 65 and the clamping surface on the exterior of said flange 56. Therefore, when the horizontal extension of fastener 59 is locked in place on said flange 56 and the tapered portion of the leg extension is forced into said groove 64, the intermediate portion 68 of the leg extension of resilient metal will be forced to spring slightly outwardly, as clearly shown by Figure 3.

Enclosed between flanges 46 and 47 is a metal disc 70. The metal disc 70 has a hub portion 71 secured to the end of a shaft 72 by a pin 73; said shaft 72 will be referred to as a driven shaft. Positioned between said disc 70 and said flange portion 51 is assembled a washer, or circular frictional disc, of sintered material 74 having an axial opening 75; said disc, or washer, 74 being composed of a bronze compound with a high coefficient of friction and usually in a dry condition. Positioned between said disc 70 and said flange 55 is assembled a washer, or circular frictional disc, of sintered material 76 having an axial opening 77. Said washers 74 and 76 form discs of frictional material to frictionally couple said clutch housing 45 with said metal disc 70. Said discs 74 and 76 are held in close engagement with flanges 51 and 55 as well as disc 70 by adjusting the position of flanges 52 and 56. The hub 71 is formed with a recess 80 to receive and have secured therein a self-aligning ball bearing 81, usually known as a S. K. F. bearing. Said bearing 81 is composed of inner race 82 and an outer race 83 and with double rows of balls 84. The inner race 82 is designed to be received on the inner end portion 85 of the driving shaft 36, and having its exterior provided with double ball tracks with smooth surfaces 86. Concentrically arranged with the inner race 82 is the outer race 83 formed on the exterior so as to be fitted within recess 80 of hub 71. The race member 83 is provided with an inner spherical surface 87 facing and spaced from the exterior surface 86 of the inner race 82. Said balls 84 are arranged between the two race members in rolling contact with the surfaces 86 and 87. The inner race is held by the drive shaft permitting the outer race to travel freely around its spherical pivot point. It will be noted that by the assembly described, the driven shaft 72 can be flexed out of axial alignment with the drive shaft 36 while in motion without causing undesirable vibrations. The bearing structure and arrangement thereof does not permit the sintered metal disc 70 to drop out of its proper position and drag upon the inner radial surface of the horizontal cylindrical portion 52 of the male housing member 46; however, responding to increase or decrease load placed upon the driven shaft. Friction between the metal disc 70 and associated parts is obtained truly by the side pressure therebetween and not by the contact of the peripheral surface of the metal disc 70 and the inner annular surface of flange portion 52 of member 46. The free end of shaft 72 secured to the metal disc 70 may rotate about the same axis of rotation as that of said shaft 36; however, it can be raised or lowered from its horizontal plane due to the function of said housing and said bearing assembled therewith.

The shaft 72 is connected with a flexible coupling 90. Said coupling 90 has one end 91, a shaft 92 assembled therewith for supporting a film take-up reel E, and it has its opposite end 93 mounted in a free floating socket 94 which allows slight raising and lowering of said shaft 92.

Said socket 94 is mounted in a bearing member 95 supported by the side wall 41 of housing K.

The supply film reel A is mounted upon a shaft and is arranged with a clutch similar to that just described for the film take-up reel. A clutch housing 45 is mounted upon a shaft 96 supported in a bearing 97 assembled with the side wall 40 of the printer housing K. Said shaft 96 has a crank arm 98 assembled therewith and outside the housing K for use in rewinding the film upon reel A when desired. Shaft 96 is connected with a coupling 100 similar to coupling 90. Said coupling 70 has one end 101 of a shaft 102 assembled therewith for supporting the film supply reel A, and it has its opposite end 103 mounted in a free floating socket 104 which allows slight raising and lowering of said shaft 102. Said socket 104 is mounted in a bearing member 105 supported by the side wall 41 of housing K.

The idler roller B is mounted upon a shaft 107 assembled in bearings 108 and 109 attached to the side walls 40 and 41 of printer housing K. The major portion of idler roller B is broken away in Figure 2 so as to show the film web 20 traveling upwardly from behind focal roller C on to the film take-up reel E. The web 20 upon reels A and E is shown with perforated edges; however, this is not absolutely necessary, other web material may be used.

The above described mechanism forms a yielding coupling, permitting variance of speed and power of the take-up reel shaft dependent upon the instant diameter of the film roll on a radially winding film web take-up reel driven by the reel shaft, said novel action being accomplished by the slippage of the frictional discs of sintered material between the metal disc and the clutch housing which can be adjusted as to clearance and locked in position by any suitable means. When the reel pull is increased, the force is transmitted to the weighted disc which presses the frictional discs into tighter engagement with said clutch housing. As for example, if the force is downward on shaft 92, this force causes the ends 91 and 93 thereof to seek a lower level. Said shaft end 93 mounted in a free floating socket 94 moves downwardly. Said shaft end 91 being connected with coupling 90 is permitted to move downwardly. The lowering of said shaft 92 causes the free end of shaft 72 to move downwardly, causing the lower portion of disc 70 to press the sintered washer 74 against the lower part of the flange wall 51 of the clutch housing 45; likewise, the upper portion of the disc 70 presses the sintered washer 76 against the top portion of wall 55 of said housing; this action increasing the friction between the free parts, giving increased power to drive the reel E upon shaft 92. Therefore, as the weight of the reel and film increases, the friction between the discs and the housing increases, thus providing automatic compensation of power and friction for all sizes and weights of reels and film.

It is also to be understood that while the friction increases between the parts within the clutch housing 45 as the weight of the take-up reel with film increases, the friction decreases between the parts within the clutch housing adjacent the film supply reel A as the weight of said supply reel and film decreases. This is necessary to provide the required drag on the web of film eliminating any unnecessary slack between the rollers.

With the shafts, supporting reels of film, supported in sockets and connected with couplings, the sockets more or less act as an adjustable pivot for the supporting shaft. As for example, when the reel is heavy, the socket 94 allows the end 93 of shaft 92 to move slightly downwardly and at the same time permitting end 93 to pivot thereby allowing the end 91 of said shaft to move downwardly in a clockwise direction. The lowering of said end 93 lowers the coupling 90 and in turn forces the free end of shaft 72 downwardly pressing the driven disc and the circular frictional discs of sintered material into tighter engagement with said housing 45. The printer, having a clutch housing embodying a self-aligning bearing assembled therewith, permits the angular movement of the free end of shaft 72, the associated hub portion 71, and disc 70, to vary, thus varying the frictional coupling as a function of weight of said film reel and film upon said supporting shaft.

Although the foregoing description is necessarily of a detailed character, in order to define the structure, function and advantages of the invention, it is to be understood that the specific terminology is not intended to be restrictive or confining and that various rearrangements of parts and alternate combinations of elements may be resorted to without departing from the scope of the invention as herein claimed.

I claim:

A weight sensitive pull and brake clutch of the character described, comprising a drive shaft, a cup-shaped driving member mounted on said shaft for rotation therewith, a second cup-shaped driving member having an axial opening therethrough and being assembled with said first-mentioned cup-shaped member, the flange portions of each of said members having complementary threads for assembly of said members into a housing of adjustable width, a driven disc within said housing, said driven disc being rotatable about the axis of said drive shaft and said driving members, a circular frictional disc of sintered material positioned adjacent each of the opposite sides of said driven disc frictionally coupling said driven disc to said driving members, said frictional discs, said driven disc and said driving members all operating in a dry condition and free of a lubricant, a pivot-type bearing assembled in conjunction with said driven disc and the end portion of said drive shaft within said housing for supporting and pivoting the driving members and driven disc about a fixed center, and a driven shaft having one end secured to said driven disc for rotation therewith about said axis of rotation of said drive shaft, said driven shaft extending through said axial opening of said housing and being spaced from the walls of said housing to permit angular movement of the free end of said driven shaft to vary said frictional coupling as a function of the weight placed upon or removed from said driven shaft.

References Cited in the file of this patent
UNITED STATES PATENTS 2,545,960     Kuehn _____ Mar. 20, 1951

FOREIGN PATENTS 759,920     France _____ Dec. 6, 1933